United States Patent [19]
Schneider et al.

[11] Patent Number: 5,832,452
[45] Date of Patent: Nov. 3, 1998

[54] HOTEL DATABASE INQUIRY SYSTEM

[75] Inventors: Robert L. Schneider, Bremerton; Kent D. Turner, Bainbridge Island; Karen L. Stavnes, Suquamish, all of Wash.

[73] Assignee: Electronic Data Systems Corporation, Plano, Tex.

[21] Appl. No.: 594,460

[22] Filed: Jan. 31, 1996

[51] Int. Cl.$^6$ .................................................. G06F 17/60
[52] U.S. Cl. .................................................. 705/5; 707/4
[58] Field of Search ........................ 705/5, 6, 10; 707/4; 345/146, 352–354

[56] References Cited

U.S. PATENT DOCUMENTS

| | | | |
|---|---|---|---|
| 4,553,206 | 11/1985 | Smutek et al. | 705/1 |
| 4,720,849 | 1/1988 | Tayama | 379/90 |
| 5,206,949 | 4/1993 | Cochran et al. | 707/4 |
| 5,305,195 | 4/1994 | Murphy | 235/375 |

OTHER PUBLICATIONS

Ann Marie Kerwin, "On–Line computer reat estate services", Adversing/Promotion, Editor&Publisher, Nov. 28, 1992.

*Primary Examiner*—Frantzy Poinvil
*Attorney, Agent, or Firm*—Ann C. Livingston; L. Joy Griebenow

[57] ABSTRACT

A method of using a computer to select hotels described in a database. A special user interface permits entry of criteria in one or more categories that describe the hotel. The computer searches the database and displays a list of hotels that satisfy the criteria. The computer then permits the user to identify any hotel on the list and, in response, displays detailed information about that hotel. The selection categories and the detailed information are designed to provide two levels of information, thereby separating objective evaluation from subjective browsing.

18 Claims, 5 Drawing Sheets

HOTEL DATABASE INQUIRY SYSTEM

TECHNICAL FIELD OF THE INVENTION

The present invention relates generally to using a computer to query a database, and more specifically to a special user interface for querying a database for hotel information.

BACKGROUND OF THE INVENTION

Database inquiry systems are widely used for various industry-specific applications. Often the success of a database system depends on its user interface, and whether information in the database may be easily and intuitively accessed. The use of icons and desktop metaphors has done much to increase the ease with which databases access is accomplished by a user.

A common feature of database inquiry systems is the user's entry of one or more selection criteria. The database is organized so that the criteria can be compared to data in the database. The user reviews a list of items in the database that satisfy that criteria.

The user interface to the database determines how "open ended" the selection process and the results are. For example, the available criteria might be limited to a displayed menu or list. Or, the available criteria could be "open ended," with keyboard entry of any criteria. The search results might be a closed list of items. Or, the search results could be a list of files, from which further inquiry can be made.

Hotel databases are one application of database inquiry systems. The user interface determines how efficiently the search can be performed and how comprehensive the results are.

SUMMARY OF THE INVENTION

One aspect of the invention is a method of using a computer to provide hotel information. A database stores hotel data that describes a number of hotels in terms of various hotel selection categories. The computer receives input from a user of search criteria in one or more of these categories. The computer then searches the database for hotels whose data matches the criteria, and displays a list of these hotels. The user may then select one or more of the hotels on the list. In response to this selection, the computer accesses the hotel data of that hotel, and displays detailed data about that hotel.

In this manner, the computer system provides two levels of information. A first level is a list of hotels that meet specific and objective criteria. A second level is detailed data about any hotel on the list, so that the user can make a subjective evaluation.

An advantage of the invention is that it permits a user to provide his or her own criteria for selecting a hotel. After determining hotels that satisfy the criteria, the user may then evaluate them in accordance with personal preferences and business requirements. A balance is reached between efficiency and simplicity of use and the provision of comprehensive information.

In the case of business travel, the system allows the user and his or her employer to satisfy both company-dictated policy and employee preferences. Productivity and economy in business travel are maximized. For example, the employer may have negotiated a favorable rate with a particular chain. The employee can obtain a list of hotels with that chain in a certain city, and then select the one that satisfies personal needs. In the case of non-business travel, the user can first determine those hotels that meet minimum requirements, and then browse detailed information for a truly personalized choice.

DETAILED DESCRIPTION OF THE INVENTION

Figure 1:
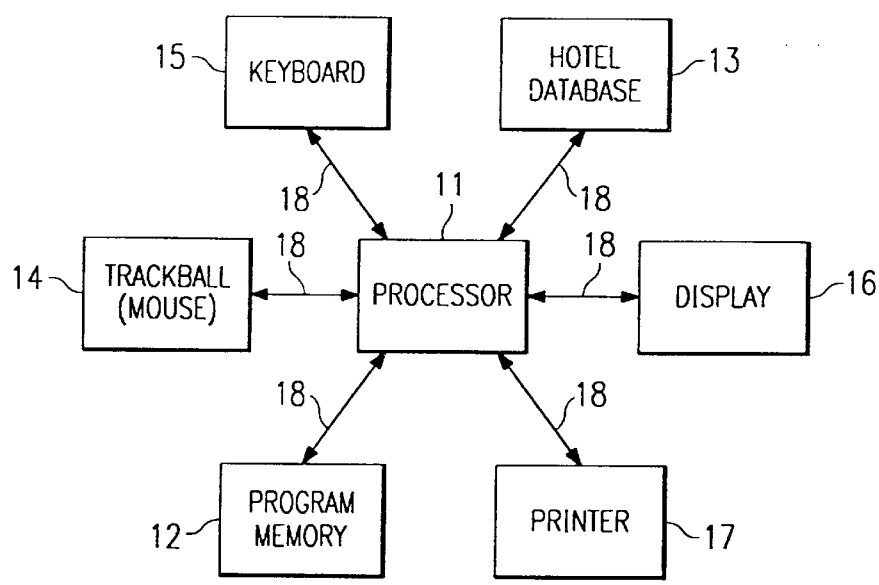
FIG. 1 illustrates an example of a computer system for storing and retrieving hotel data in accordance with the invention.

FIG. 1 illustrates an example of a computer system 10 for storing and retrieving hotel data in accordance with the invention. Computer system 10 comprises a processor 11, program memory 12, hotel database 13, a trackball 14 and keyboard 15 for user input, a display 16, and printer 17. In the embodiment of FIG. 1, system 10 is a "stand-alone" system, and processor 11 is in data communication with the various peripheral devices via a standard bus 18. However, in other embodiments, the invention could be implemented with a workstation processor having local input and output devices, but whose program memory 12 or hotel database 13 are in remote locations with a long distance data communications link such as a modem (not shown).

An example of a suitable computer system 10 is one operating in accordance with the Microsoft WINDOWS operating system. However, for workstation implementations, system 10 could be of a type such as those available from Sun Microsystems. Processor 11 may be any general purpose processor having a CPU, RAM, ROM, and I/O circuitry. Other input devices instead of, or in addition to, trackball 14 and keyboard 15 could be used, such as touch pads, joysticks, or light pens.

As explained in further detail below, one aspect of the invention is the use of computer system 10 to access hotel database 13 to provide a user with information about hotels within a given geographical area. In the example of this description, this geographical area is worldwide, and database 13 stores data about hotels within this area. However, in other embodiments, database 13 might store data about hotels in a smaller geographical area, such as a particular continent or country. Each hotel has associated hotel data that describes the hotel in terms of features such as location and rates. Processor 11 is programmed with a special user interface that permits the user to enter criteria pertaining to the stored features. Processor 11 uses these criteria to search database 13 to find and list hotels that satisfy these criteria. Then, for each hotel, the user may browse additional "property level" information.

Database 13 could be organized in a conventional file format, having a file for each hotel included in the database, for searching of records of data describing that hotel. Or, database 13 could be arranged in an object-oriented manner for attribute searching.

Figure 2:
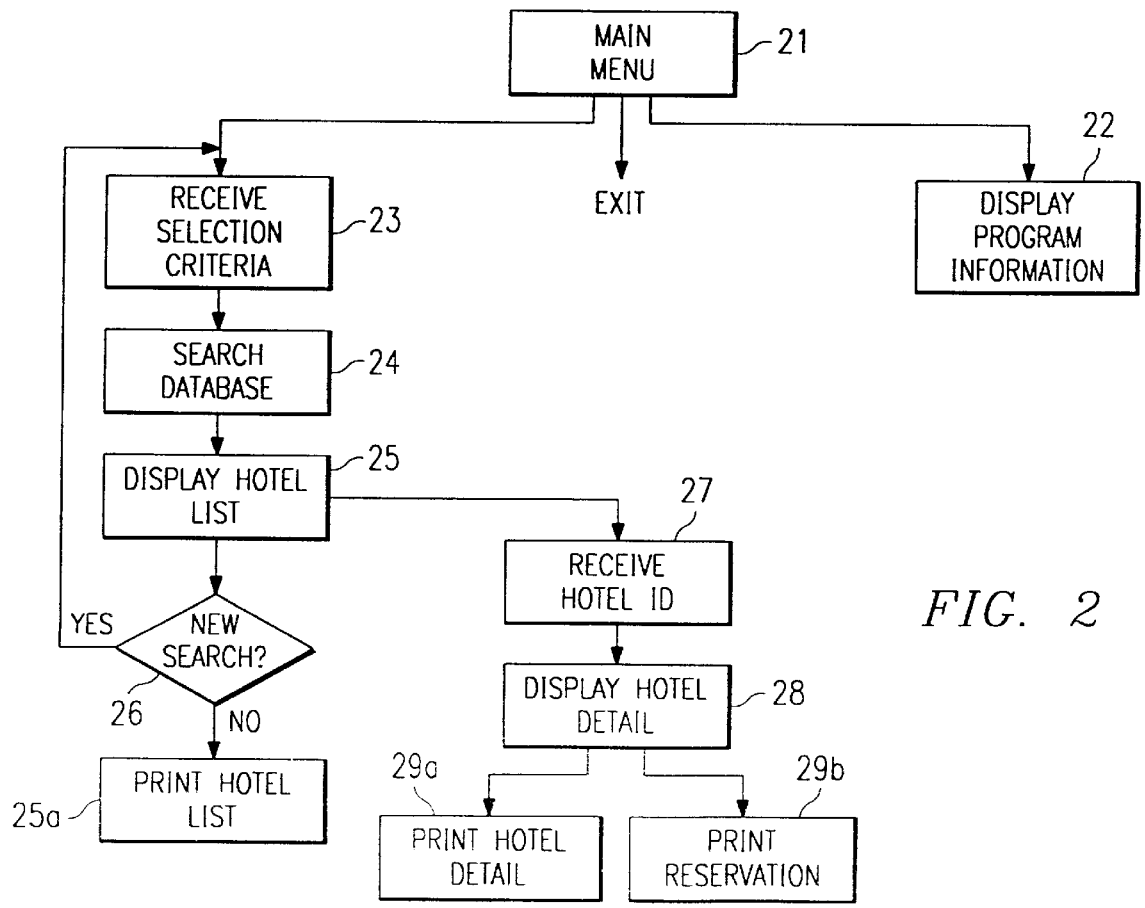
FIG. 2 illustrates the hotel inquiry process executed by the computer system of FIG. 1.

FIG. 2 illustrates the hotel inquiry process executed by processor 11. The process is interactive, with processor 11 responding to input by the user via a trackball device (mouse) 14 or keyboard 15. As is common with today's personal computer systems, mouse 14 is used to point a cursor at an icon, button, or other graphical prompt and to click on that prompt to initiate processor activity.

In Step 21, processor 11 displays an introduction screen on display 16. This screen informs the user that the hotel inquiry process is ready for use. It provides the user with a choice of either beginning the process or exiting.

Figure 3:
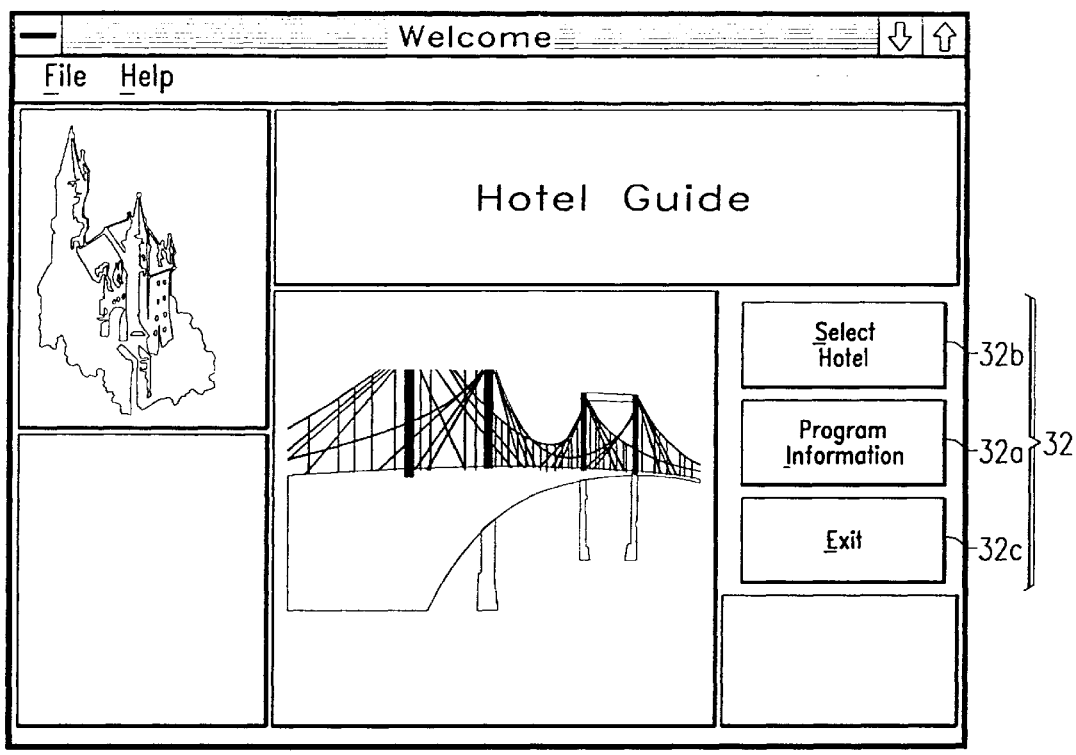
FIG. 3 illustrates an example of Step 21 of FIG. 2.

FIG. 3 illustrates an example of Step 21, a Welcome screen 30 generated by processor 11 and displayed on display 16. Welcome screen 30 has a Main Menu 32, which gives the user a choice of three "buttons" 32a–32c. Any button 32a–32c may be activated with a click of mouse 14. The Program Information button 32a is explained below in connection with FIG. 4, and provides general hotel information on display 16. The Select Hotel button 32b is explained below in connection with FIGS. 4–7, and permits the user to select hotels. The Exit button 32c ends the hotel inquiry process. The rest of screen 30 could provide additional information or pictorial illustration.

Referring to both FIGS. 2 and 3, Step 22 is performed if the user selects the Program Information button 32a. In Step 22 processor 11 retrieves data from memory 13 representing one or more topics of general hotel information and generates a display of that information. This information is not specific to any one hotel. For example, the topics might pertain to policies, such as cancellation, "no-show," or preferred rate policies. If more than one topic is to be available, some sort of index is presented to the user.

Figure 4:
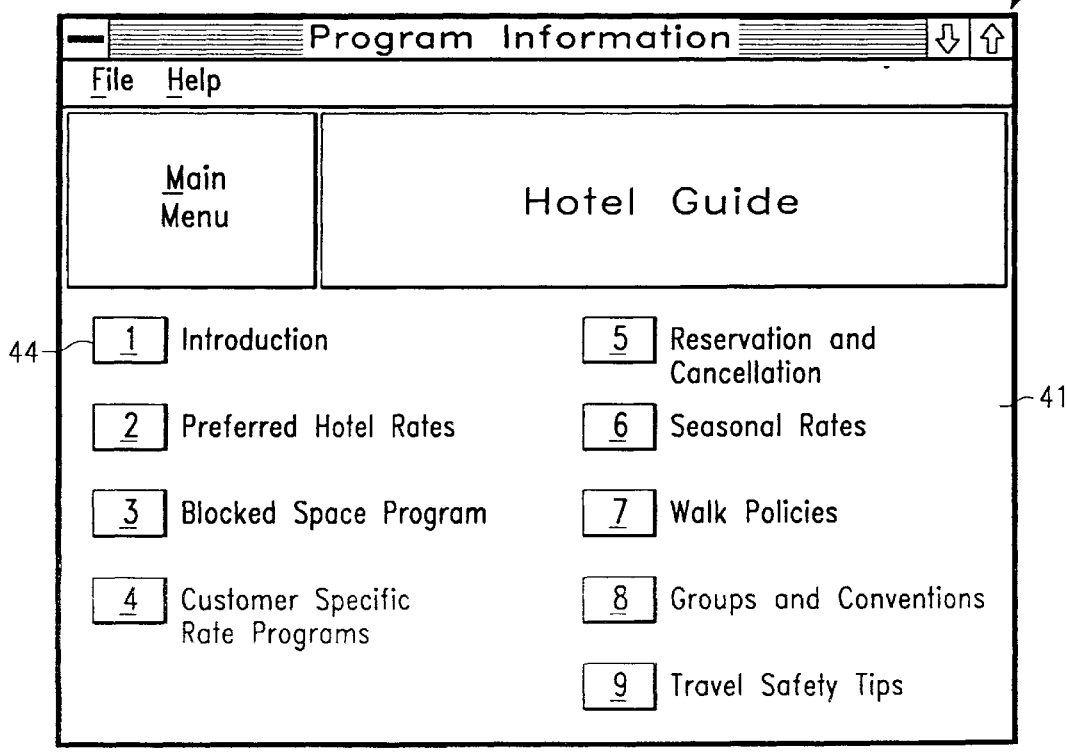
FIG. 4 illustrates an example of Step 22 of FIG. 2.

FIG. 4 illustrates an example of Step 22, a Program Information screen 40, which is generated in response to selection of button 32a on the Main Menu 32 of FIG. 3. The Program Information screen 40 provides the user with an index 41 of topics. Each topic is associated with a different button 44. In response to selection of any of these buttons, processor 11 accesses data in database 13 and displays the corresponding information on display 16. This information may be customized, such as to users in a particular geographical area, to a particular group of users, or to a particular employer in the case of business travel. In other words, a topic available to one set of users might be amended or deleted for another set of users.

Referring again to FIG. 2, if the user desires to perform the hotel selection process, Step 23 is receiving hotel selection criteria. During this step, processor 11 enters a data entry mode, so that it may receive the selection criteria via mouse 14 or keyboard 15. As explained below in connection with FIGS. 5 and 6, in the example of this description, processor 11 provides a dialog box with blank spaces, each associated with a different selection category. In other embodiments, processor 11 might provide other input prompts such as icons, charts, or lists. For example, selection from a "city" category might be prompted by display of a map of cities, to which the user could point with a cursor. Depending on the prompt, the criteria can be entered by keyboard 15 or selected by mouse 14. Referring again to FIG. 3, in the example of this description, Step 23 begins in response to the user clicking on the Select Hotel button 32b of Main Menu 32.

Figure 5:
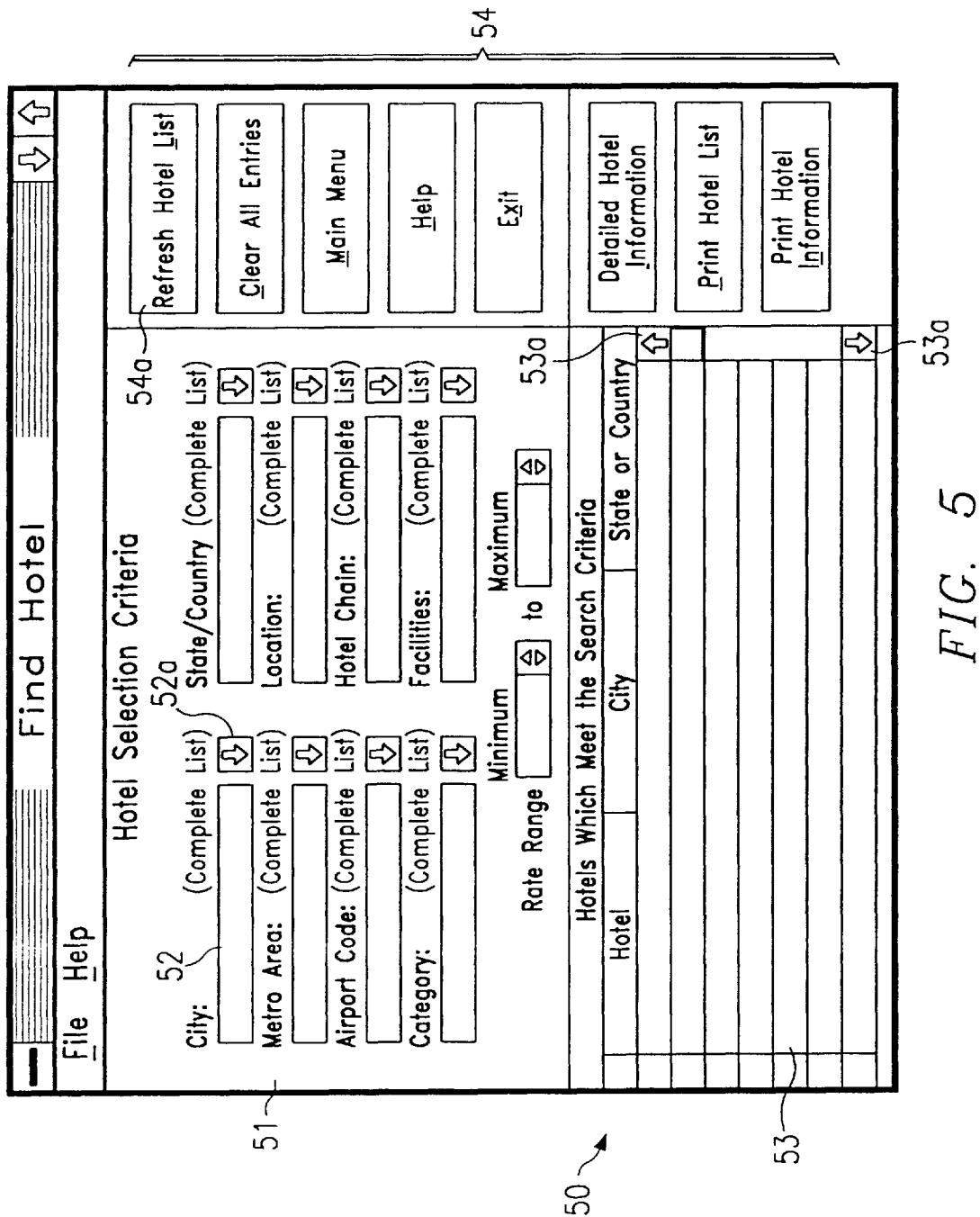
FIG. 5 illustrates an example of Step 23 of FIG. 2.
Figure 6:
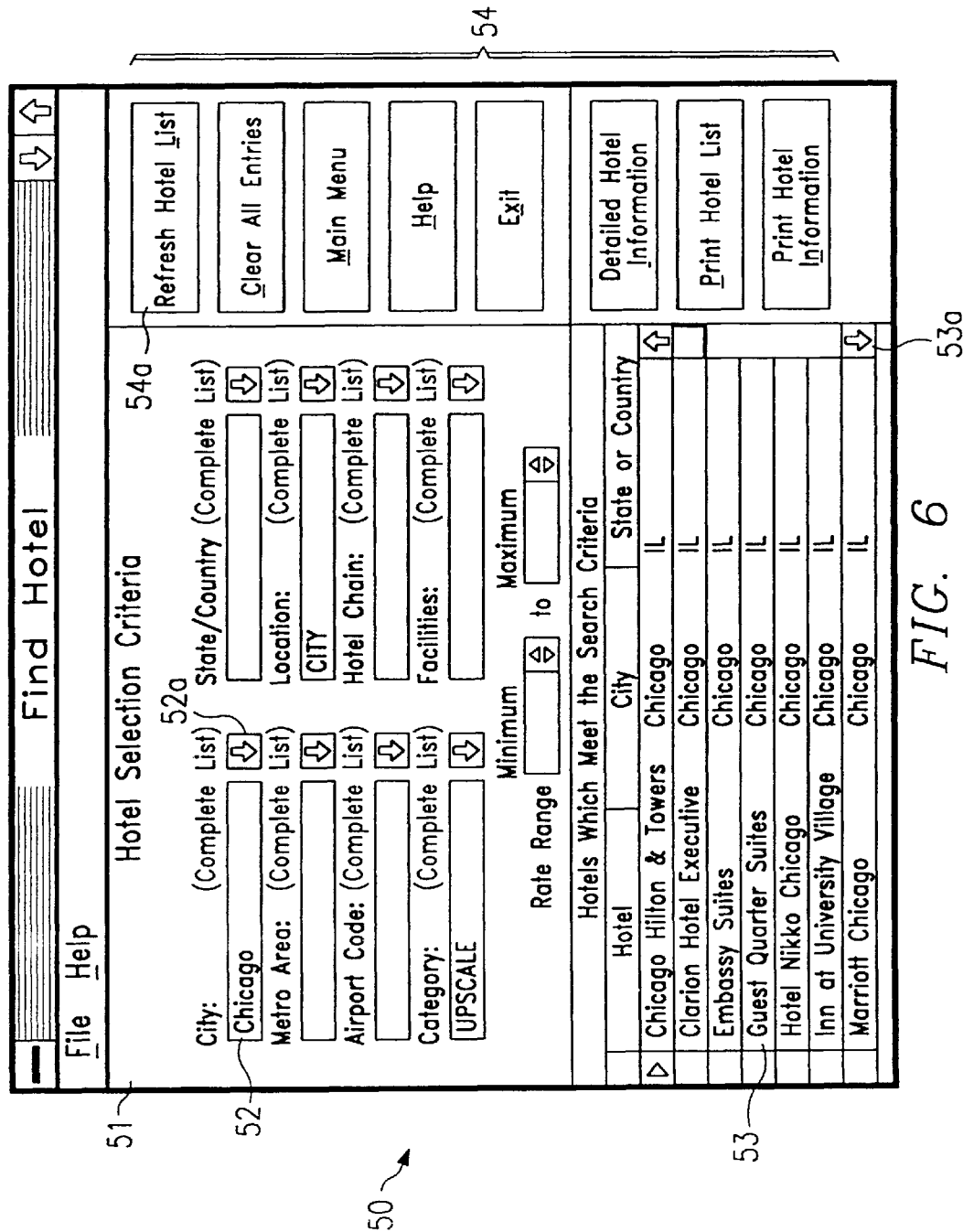
FIG. 6 illustrates input of selection criteria to the dialog box of FIG. 5 and a corresponding list of hotels that meet these criteria.

FIGS. 5 and 6 illustrate Step 23, implemented with a dialog box 51 that is part of a Find Hotel screen 50. In FIG. 5, the user has not yet entered selection criteria. Dialog box 51 contains ten "blanks" 52, into which the user may enter information. Each of these blanks 52 represents a different selection category. These categories are: city, metro area, airport code, hotel category, state or country, location, hotel chain, facilities, minimum rate, and maximum rate. Each blank is accompanied by a list-arrow 52a, which permits the user to browse up and down a list of available selections in that category. The airport code category includes standard airport identifiers, such as "DFW" for the Dallas-Fort Worth airport. Examples of hotel category criteria are "first class" or "tourist". Examples of location criteria are "airport" or "downtown". An example of a facility criteria is "accessible to disabled". These are the categories of data that describe each hotel in database 13. In other embodiments, other and additional categories could be stored and prompted for criteria.

In FIG. 6, the user has entered three criteria: "Chicago" to specify a city, "upscale" to specify a category, and "city" to specify a location. These could have been entered by typing in the word via keyboard 15 or by scrolling the list accompanying the category and highlighting the desired entry via mouse 14. The user may enter only one criteria or any number of criteria, depending on how quickly the user desires to narrow the selection process. As explained below, if desired, the user might make a "first pass" with one or two criteria, and has the option of entering additional criteria if the first pass results in too many choices.

Referring again to FIG. 2, in Step 24, processor 11 searches database 13 to find hotels whose data matches the user's criteria. Known database searching techniques may be used. The search can be a conventional search for a match of text in records or could be implemented with artificial intelligence techniques such as heuristic rules that find a best match or accommodate spelling errors. As stated above, database 13 can be organized in any manner that permits searching of hotel data, with the search of Step 24 being appropriate for the database organization.

In Step 25, processor 11 displays a list of hotels, if any, in database 13 that satisfy the user's criteria. The "list" could be a list of hotel names or a map with tags, or any type of graph or textual information.

FIG. 6 illustrates an example of the hotel list 53 provided in Step 25. In this example, the hotel list 53 is displayed on the same screen 50 as the dialog box 51 containing the selection criteria. As illustrated, Step 25 has resulted in a number of hotels. The list 53 may be scrolled by means of scroll buttons 53a.

Referring again to FIG. 2, in Step 26, the user may modify or repeat the search by adding, deleting, or changing criteria entered in Step 23. This will result in a new hotel list 53.

FIGS. 5 and 6 illustrate how Step 26 may be implemented as part of a menu 54 on the Find Hotel screen 50. Menu 54 provides a number of available actions that can be taken before or after entry of criteria and searching. Each available action has an associated button 54a. A Refresh Hotel List button results in a new hotel list if the user has modified the search criteria. The Clear button permits the user to clear the selection criteria and start an entirely new search. The Main Menu button return the user to the Main Menu 32. The Help button displays help information for explanation of how to use system 10. The Exit button ends the hotel inquiry process. The Detailed Hotel Information button provides detailed information about a listed hotel, as explained below in connection with FIG. 7. The Print Hotel List button prints the hotel list 53 on printer 17. The Print Hotel Information button prints detailed information about a selected hotel on list 53.

Referring again to FIG. 2, in Step 27, processor 11 receives an identifier from the user of a hotel on the list 53.

In the example of FIG. 6, Step 27 is performed if the user highlights a hotel on the hotel list 53 and clicks the Detailed Hotel Information button on menu 54. In Step 28, processor 11 generates a display of detailed hotel information about the hotel selected in Step 27. This display will include data from database 13 that describes that hotel in the various selection categories and may include additional information.

Figure 7:
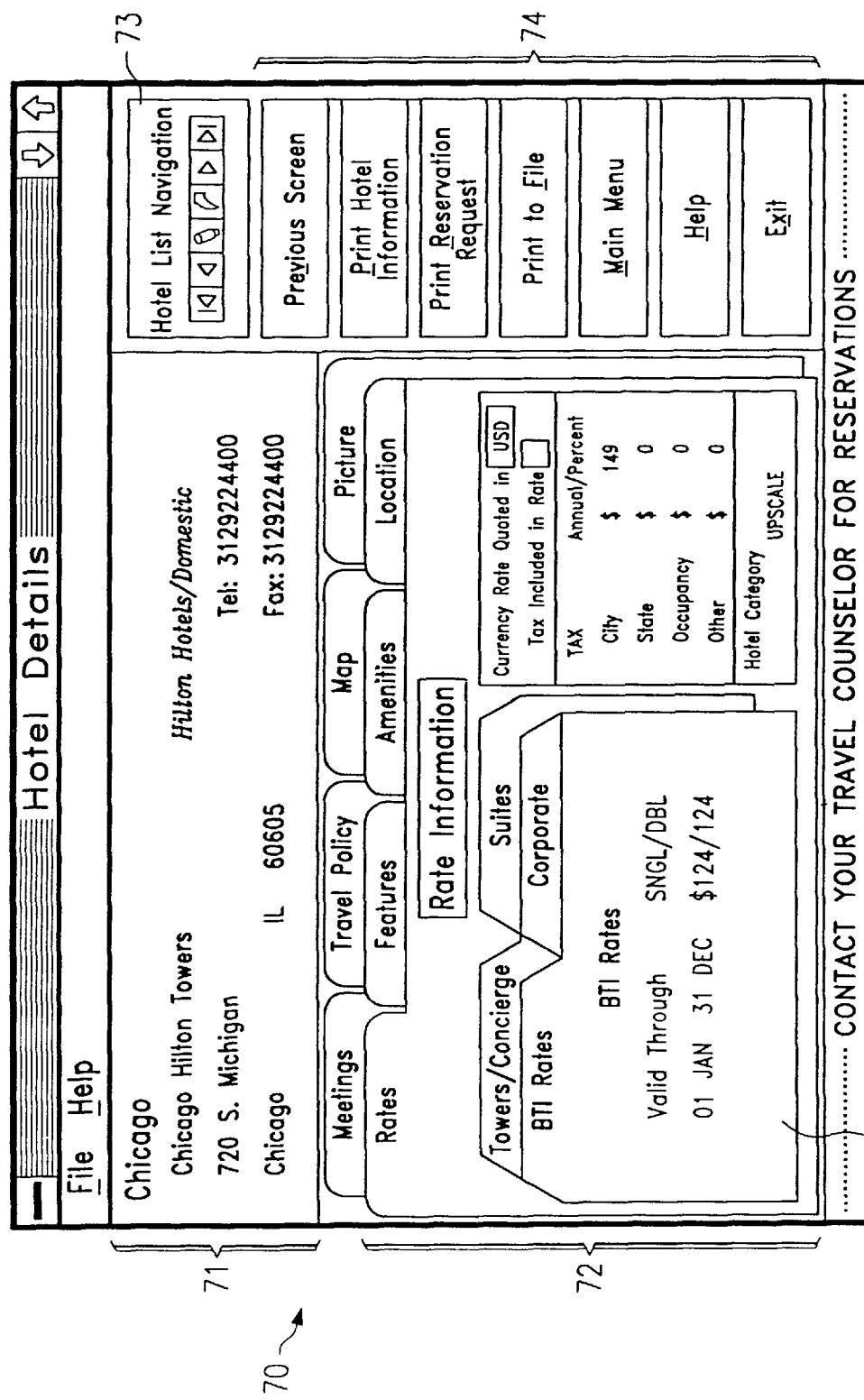
FIG. 7 illustrates an example of Step 28 of FIG. 2.

FIG. 7 illustrates an example of Step 28, a Hotel Information screen 70, with "property level" information for a particular hotel. The Hotel Information screen 70 includes a directory box 71 with information such as the hotel's address and telephone. It also has a Files box 72, with virtual files for various categories of data. These categories include Meetings, Travel Policy, Map, Picture, Rates, Features, Amenities, and Location. Each field contains text or graphics with information particular to the selected hotel. In FIGURE 7, the Rates file is "open" and rate information is displayed on the screen. A file is opened by clicking on the tab at the upper left corner of the file. For example, if a user viewing the display of FIG. 7 were to click on the tab of the Meetings file with mouse 14, the Rates file would close and the Meetings file would open. The Rates information would be replaced by Meetings information on display 16.

As illustrated in FIG. 7, the Rates file has a number of subfiles. These include "Towers", "Suites", "BTI Rates", and "Corporate", each representing a unique category of rates. Each subfile may be opened by clicking on its tab. When opened, these subfiles provide information about special rates. The other files of the files box 72 of Hotel Information Screen 70 operate in a manner similar to the Rates file. The Features file displays information such as room type, blackout dates, guarantee and cancel policy, and accessibility to the disabled. The Amenities file displays information such as complementary breakfast, free local calls, health club, fax in room, and coffee in room. The Location file displays information such as the nearest airport and its distance from the hotel and airport transportation.

The Hotel Information screen 70 also has set of Navigation buttons 73. These buttons 73 permit the user to change the display to view detailed information about the first, last, next, previous hotel on the list 53, or to mark a hotel on the list 53, or to jump to a marked hotel. A Hotel Detail Menu 74 provides additional options. Previous Screen button returns the user to the previous screen. A Print Hotel Information button causes detailed information about the currently selected hotel to be printed. A Print Reservation button causes a reservation form for the currently selected hotel to be printed. A Print to File button causes the data on screen 70 to be copied to a data file. A Main Menu button returns the user to the Main Menu 32. A Help button causes program information to be displayed. An Exit button ends the hotel inquiry process.

Other Embodiments

Although the invention has been described with reference to specific embodiments, this description is not meant to be construed in a limiting sense. Various modifications of the disclosed embodiments, as well as alternative embodiments, will be apparent to persons skilled in the art. It is, therefore, contemplated that the appended claims will cover all modifications that fall within the true scope of the invention.

What is claimed is:

1. A method of using a computer to provide hotel information, comprising the steps of:

storing hotel data in a database, said hotel data describing a number of hotels, wherein at least some of said hotel data is associated with one or more hotel selection criteria;

receiving criteria data specifying one or more of said hotel selection criteria;

searching said database for any of said hotels whose hotel data matches said criteria data;

displaying a set of candidate hotels found in response to said searching step;

receiving hotel identifier data representing one of said candidate hotels in said set, thereby identifying a selected hotel, said step of receiving hotel identifier data being performed in response to random selection of hotels in said set;

accessing said hotel data of said selected hotel;

displaying a candidate hotel index for said selected hotel such that its associated hotel data is indexed as property level categories;

receiving property level category data that identifies a selected category; and displaying property level data associated with said selected hotel within said selected category.

2. The method of claim 1, wherein said database is organized such that each said hotel is represented by a data file and each said selection category is represented by a record of a data file.

3. The method of claim 1, wherein said selection categories comprise at least the location of each of said hotels.

4. The method of claim 1, wherein said selection categories comprise at least a rate limit of each of said hotels.

5. The method of claim 1, wherein said step of receiving criteria data is accomplished by means of a dialog box having at least one blank for entry of data via a keyboard.

6. The method of claim 1, wherein said step of receiving criteria data is accomplished by means of a dialog box having at least one list of available criteria for selection with a cursor.

7. The method of claim 1, wherein said step of receiving hotel identifier data is performed in response to a cursor being pointed to a hotel on said list.

8. The method of claim 1, wherein said step of displaying said hotel data is accomplished by displaying files for various subject matters pertaining to said selected hotel.

9. The method of claim 1, further comprising the step of printing a reservation request form for said selected hotel.

10. The method of claim 1, wherein said step of displaying a set of candidate hotels is performed by providing a textual list of said candidate hotels.

11. The method of claim 1, wherein said step of displaying a set of candidate hotels is performed such that said criteria data appears on the same display as said candidate hotels.

12. The method of claim 1, wherein said step of displaying property level data is performed such that said property level data appears on the same display as said index.

13. A computer system for providing hotel information, comprising:

a database that stores hotel data describing a number of hotels, wherein at least some of said hotel data is associated with one or more hotel selection criteria; and a user station having at least a processor, a display, an input device, and a program memory, said processor being in data communication with said database, and said processor being programmed by means of said program memory to receive criteria data via said input device specifying one or more of said hotel selection criteria, to search said database for hotels satisfying said criteria thereby generating a set of candidate hotels, to display said candidate hotels on said display, to receive a random selection of a candidate hotel from said set, to display a property level index for the selected candidate hotel, to receive a selected category from said index, and to display property level data pertaining to said selected category.

14. The computer system of claim 13, wherein said input device is a keyboard.

15. The computer system of claim 13, wherein said input device is a trackball device.

16. The computer system of claim 13, wherein said processor is programmed to display a dialog box on said display having blanks for receiving said criteria.

17. The computer systems of claim 13, wherein said processor is programmed to receive said request for additional hotel information in response to a cursor pointed to a hotel on said list.

18. The computer system of claim 13, wherein said processor is programmed to display said additional information in the form of files for various subjects pertaining to a hotel.

* * * * *